(12) United States Patent
Hsieh et al.

(10) Patent No.: US 10,780,638 B2
(45) Date of Patent: Sep. 22, 2020

(54) PLATFORM STRUCTURE OF 3D PRINTER

(71) Applicants: XYZPRINTING, INC., New Taipei (TW); KINPO ELECTRONICS, INC., New Taipei (TW)

(72) Inventors: Chi-Wen Hsieh, New Taipei (TW); Chi-Chieh Wu, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 184 days.

(21) Appl. No.: 15/800,657

(22) Filed: Nov. 1, 2017

(65) Prior Publication Data

US 2019/0077078 A1  Mar. 14, 2019

(30) Foreign Application Priority Data

Sep. 14, 2017  (CN) .......................... 2017 1 0827475

(51) Int. Cl.
*B29C 64/245* (2017.01)
*A47B 81/00* (2006.01)
(Continued)

(52) U.S. Cl.
CPC ............ *B29C 64/245* (2017.08); *A47B 81/00* (2013.01); *B22F 3/1055* (2013.01); *B33Y 30/00* (2014.12); *B22F 2003/1058* (2013.01)

(58) Field of Classification Search
CPC ....... B29C 64/245; B33Y 30/00; A47B 81/00; B22F 3/1055; B22F 2003/1058
(Continued)

(56) References Cited

U.S. PATENT DOCUMENTS

| 4,752,352 A * | 6/1988 | Feygin ................ B23K 26/083 156/154 |
| 2015/0145174 A1* | 5/2015 | Comb .................. G03G 15/224 264/464 |

FOREIGN PATENT DOCUMENTS

| CN | 205395200 U | 7/2016 |
| JP | H04341826 A | 11/1992 |

(Continued)

OTHER PUBLICATIONS

Search Report dated Jun. 11, 2018 of the corresponding European patent application.
(Continued)

*Primary Examiner* — Robert C Dye
*Assistant Examiner* — Guy F Mongelli
(74) *Attorney, Agent, or Firm* — Chun-Ming Shih; HDLS IPR Services

(57) ABSTRACT

A platform structure of 3D printer includes a movable platform (1), a work carrier (2), an electromagnet (3) and a positioning structure (4). Either of the movable platform (1) and the work carrier (2) has a magnetically attractable portion (20). The electromagnet (3) is installed on another of the movable platform (1) and the work carrier (2) and is capable of magnetically attracting the MAP (20) to make the work carrier (2) removably connect to the movable platform (1). The positioning structure (4) includes a first positioning portion (41) formed on the movable platform (1) and a second positioning portion (42) formed on the work carrier (2). The first positioning portion (41) and the second positioning portion (42) engage with each other. Thereby, the platform structure (10) is convenient to use and has a function of fast assembling and dissembling the work carrier (2).

2 Claims, 15 Drawing Sheets

(51) Int. Cl.
 *B22F 3/105* (2006.01)
 *B33Y 30/00* (2015.01)
(58) Field of Classification Search
 USPC .............................................. 425/3
 See application file for complete search history.

(56) References Cited

FOREIGN PATENT DOCUMENTS

| | | | | |
|---|---|---|---|---|
| JP | 2013067036 A | 4/2013 | | |
| WO | 2015091941 A1 | 6/2015 | | |
| WO | WO-2015091941 A1 * | 6/2015 | ............ | B22F 3/1055 |
| WO | 2015149054 A1 | 10/2015 | | |
| WO | WO-2015149054 A1 * | 10/2015 | ............. | B33Y 30/00 |

OTHER PUBLICATIONS

Office Action dated Feb. 18, 2020 of the corresponding Japan patent application.
Office Action dated Apr. 17, 2020 of the corresponding China patent application.

* cited by examiner

PLATFORM STRUCTURE OF 3D PRINTER

BACKGROUND OF THE INVENTION

1. Technical Field

The technical field relates to a platform structure, particularly to a platform structure of 3D printer.

2. Description of Related Art 3D printing is one of rapid prototyping technologies. It uses a movable platform to drive a work carrier and then layers of material such as metal or plastic powder are formed under computer control to create an object on the work carrier, which is made by additive manufacturing (AM). Currently, toy components, mechanic parts and human bones can be rapidly manufactured by 3D printing. This makes 3D printing progressively become a popular technology.

To make the work carrier accurately move to every predetermined position, however, the work carrier is usually firmly locked or tightly mounted on the movable platform for stably driving the work carrier by the movable platform. When the work carrier is needed to be removed from the movable platform, it will require complicated steps and cost much time. This causes a problem of inconveniently assembling and dissembling the work carrier and movable platform.

SUMMARY OF THE INVENTION

The disclosure is directed to a platform structure of 3D printer, which uses a magnetic force from an electromagnet to open or close to conveniently assemble a work carrier to a movable platform or dissemble a work carrier from a movable platform. Thus, an effect of rapidly assembling and dissembling a work carrier can be achieved.

One of the exemplary embodiments, the disclosed example provides a platform structure of 3D printer, which includes a movable platform, a work carrier, an electromagnet and a positioning structure. Either of the movable platform and the work carrier has a magnetically attractable portion. The electromagnet is installed on another of the movable platform and the work carrier and is capable of magnetically attracting the MAP to make the work carrier removably connect to the movable platform. The positioning structure includes a first positioning portion formed on the movable platform and a second positioning portion formed on the work carrier. The first positioning portion and the second positioning portion engage with each other. Thereby, the platform structure has a function of conveniently and fast assembling and dissembling the work carrier.

According to the above, a first positioning portion of the movable platform and the second positioning portion of the work carrier engage with each other to make the work carrier accurately positioned on the movable platform and stably move with the movable platform. Thereby, the platform structure has a function of conveniently and fast assembling and dissembling the work carrier.

DETAILED DESCRIPTION OF THE INVENTION

Figure 1:
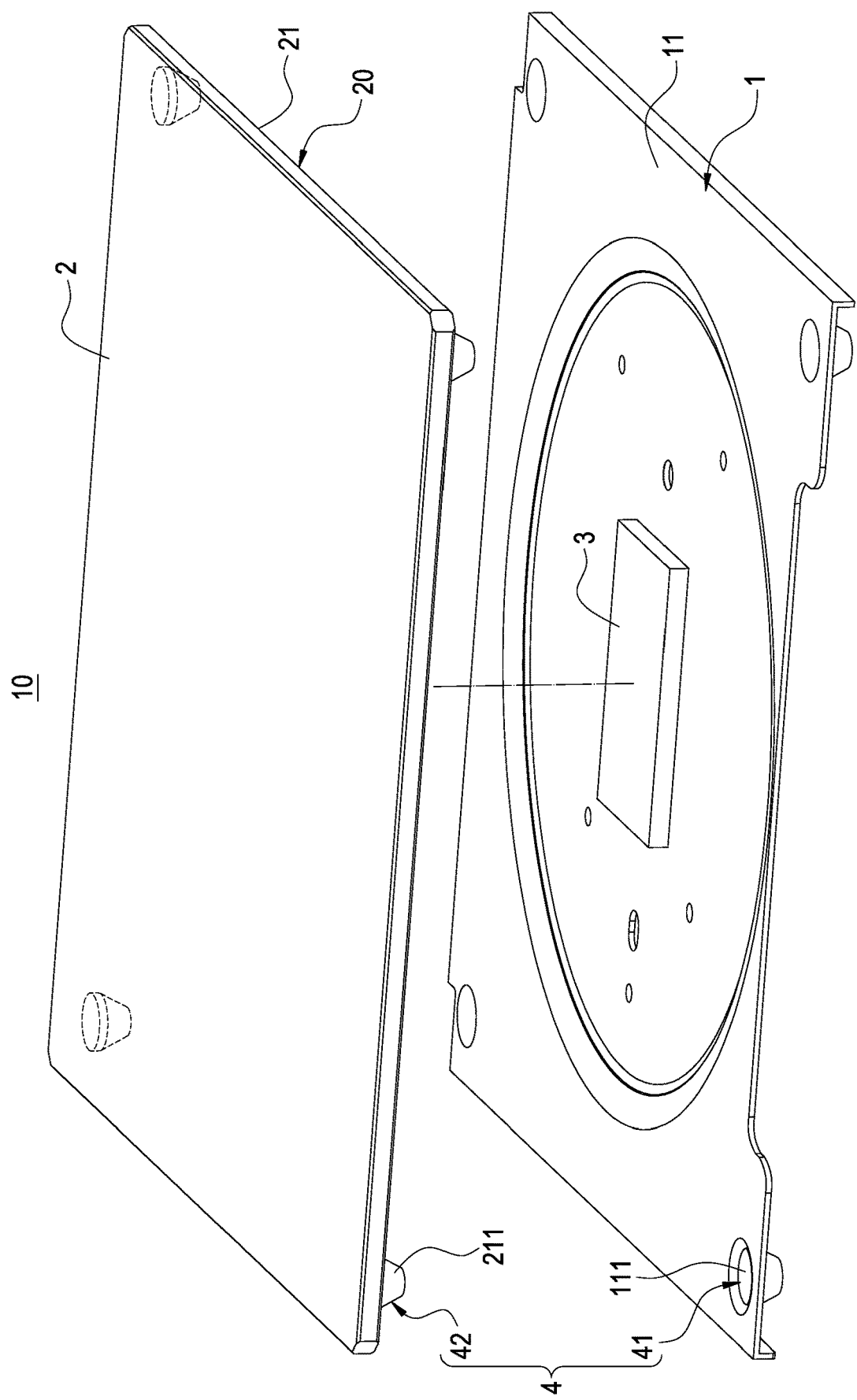
FIG. 1 is an exploded view of the first embodiment of the platform structure of the disclosed example.
Figure 2:
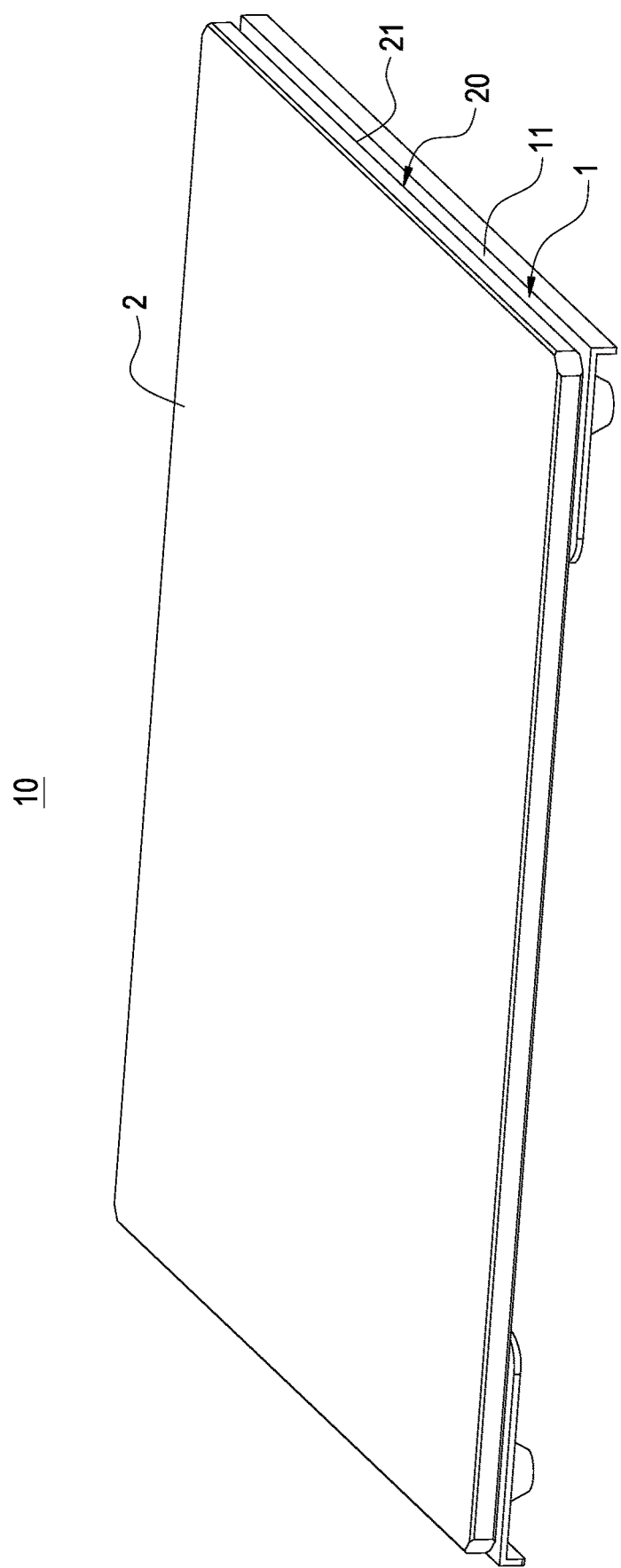
FIG. 2 is an assembled view of the first embodiment of the platform structure of the disclosed example.

Please refer to FIGS. 1-4. The disclosed example provides the first embodiment of a platform structure of 3D printer. The platform structure 10 includes a movable platform (1), a work carrier (2), an electromagnet (3) and a positioning structure (4).

As shown in FIGS. 1-4, the movable platform 1 is a 3-dimensionally movable platform in a 3D printer. The work carrier 2 is a carrier for carrying and additive manufacturing an object in a 3D printer. Either of the movable platform 1 and the work carrier 2 has a magnetically attractable portion 20. The work carrier 2 in this embodiment may be made of a magnetically attractable material. The magnetically attractable portion 20 is formed on, but not limited to, the bottom 21 of the work carrier 2.

Figure 3:
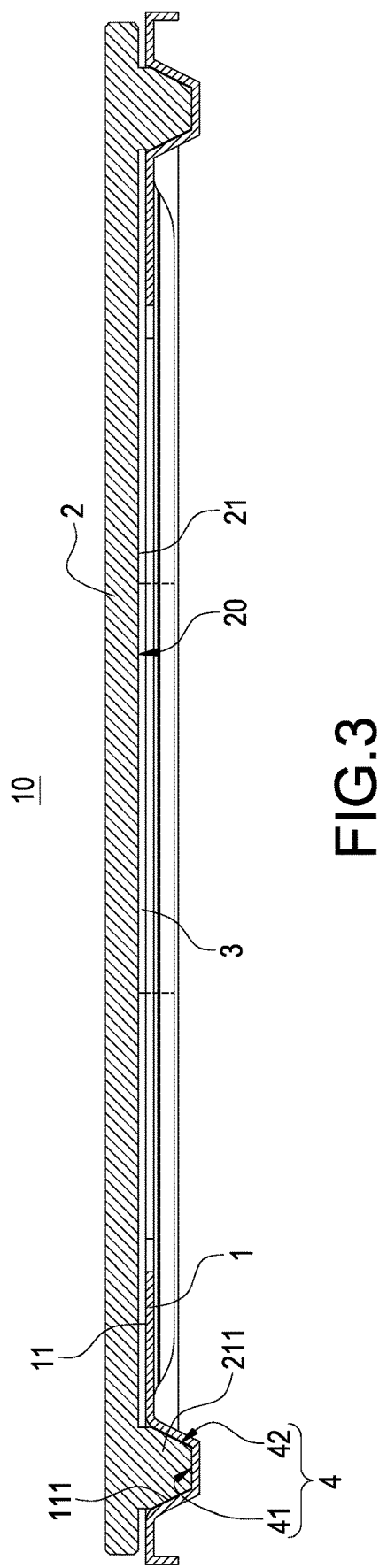
FIG. 3 is a cross-sectional view of the first embodiment of the platform structure of the disclosed example.
Figure 4:
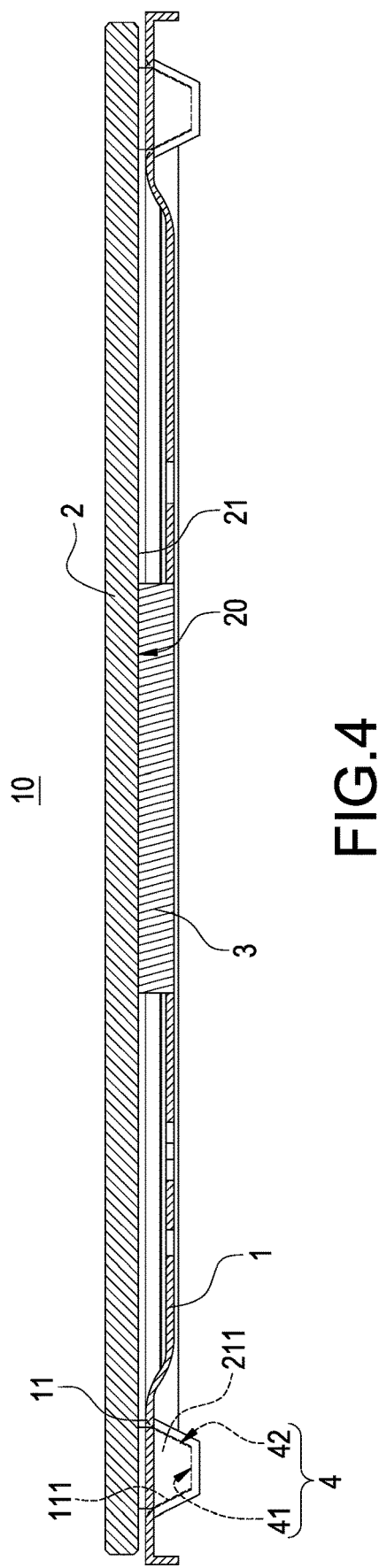
FIG. 4 is another cross-sectional view of the first embodiment of the platform structure of the disclosed example.

As shown in FIGS. 1, 3 and 4, the electromagnet 3 is installed on the other of the movable platform 1 and the work carrier 2 and is capable of magnetically attracting the MAP 20 to make the work carrier 2 removably connect to the movable platform 1. The electromagnet 3 in this embodiment is fixed on, but not limited to, the movable platform 1.

As shown in FIGS. 1, 3 and 4, the positioning structure 4 includes a first positioning portion 41 formed on the movable platform 1 and a second positioning portion 42 formed on the work carrier 2. The first positioning portion 41 and the second positioning portion 42 engage with each other.

In detail, the first positioning portion 41 includes a plurality of conic cavities 111 downward caved from the top 11 of the movable platform 1. The second positioning portion 42 includes a plurality of conic bars 211 downward projecting from the bottom 21 of the work carrier 2. Each of the conic bars 211 engages with one of the conic cavities 111. The conic bars 211 are arranged to be adjacent to a periphery of the work carrier 2.

As shown in FIGS. 1-4, the assembling and using of the platform structure of the disclosed example utilizes that either of the movable platform 1 and the work carrier 2 has the MAP 20 and that the other thereof is installed with the electromagnet 3. When the electromagnet 3 is activated and the work carrier 2 is put on the movable platform 1 by a robot hand, the electromagnet 3 magnetically attracts the MAP 20 to be convenient to install the work carrier 2 on the movable platform 1. When the electromagnet 3 is stopped to eliminate the magnetic attraction, the work carrier 2 can be rapidly separated or removed from the movable platform 1. As s result, a function of conveniently and fast assembling and dissembling the work carrier 2 can be achieved.

In addition, replacing the electromagnet 3 with a permanent magnet will have drawbacks as following. When the work carrier 2 is being separated or removed from the movable platform 1, an extra force for resisting the magnetic force of the permanent magnet is needed, but its reaction force tends to cause collision and damage of the object on the work carrier 2. When the work carrier 2 is being put on the movable platform 1, a resistance against the magnetic force from the permanent magnet is still needed before it has been put the predetermined position to cause inconvenience on putting the work carrier 2. The platform structure of the disclosed example adopting the electromagnet 3 can avoid the above problems.

Moreover, the first positioning portion 41 of the movable platform 1 and the second positioning portion 42 of the work carrier 2 engage with each other so as to make the work carrier 2 firmly positioned on the movable platform 1 and stably move with the movable platform 1. A conic shape of the conic bar 211 downward projecting from the bottom 21 of the work carrier 2 is easier to be inserted into the conic cavity 111 to achieve the advantage of fast assembling the work carrier 2.

Figure 5:
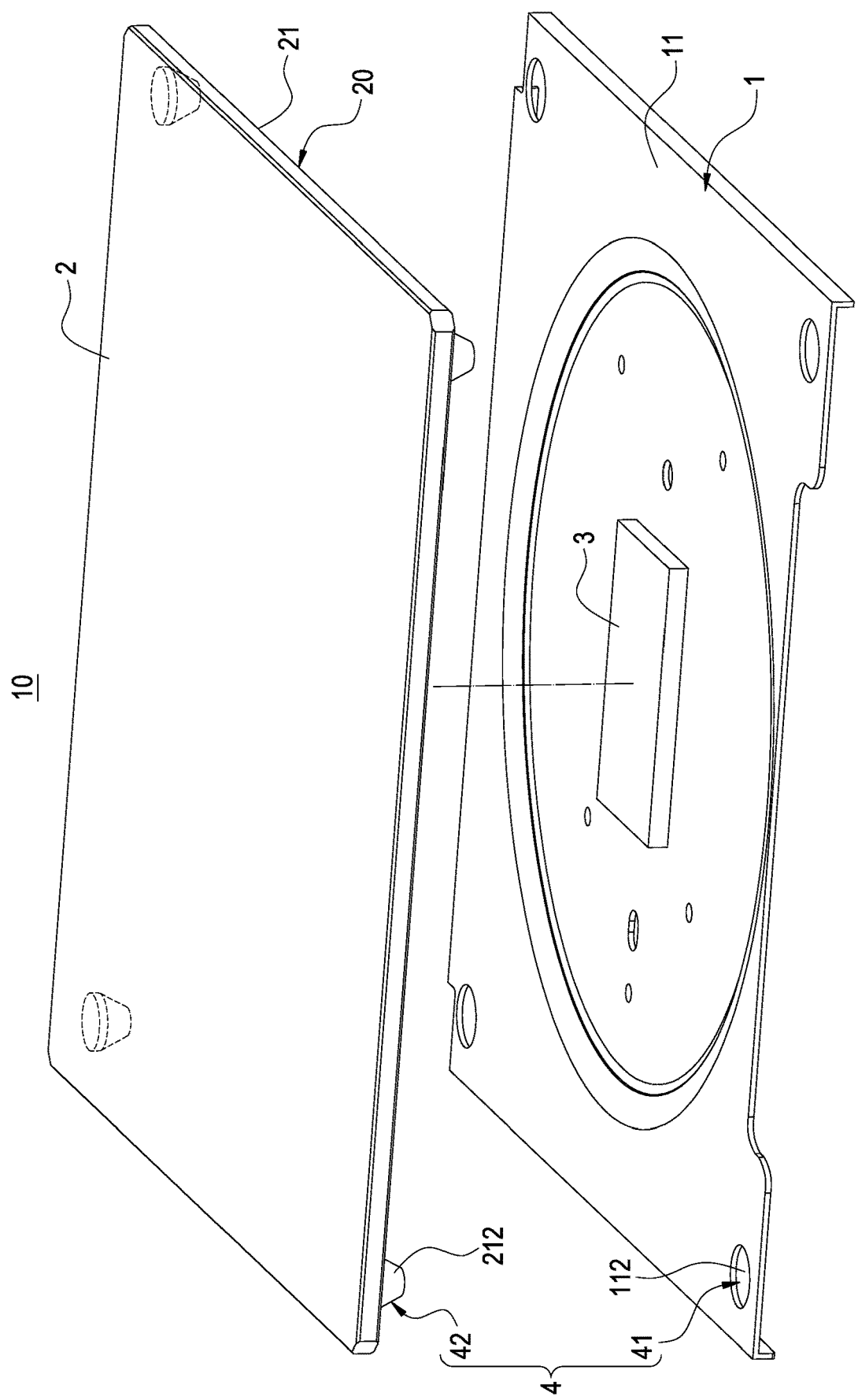
FIG. 5 is an exploded view of the second embodiment of the platform structure of the disclosed example.
Figure 6:
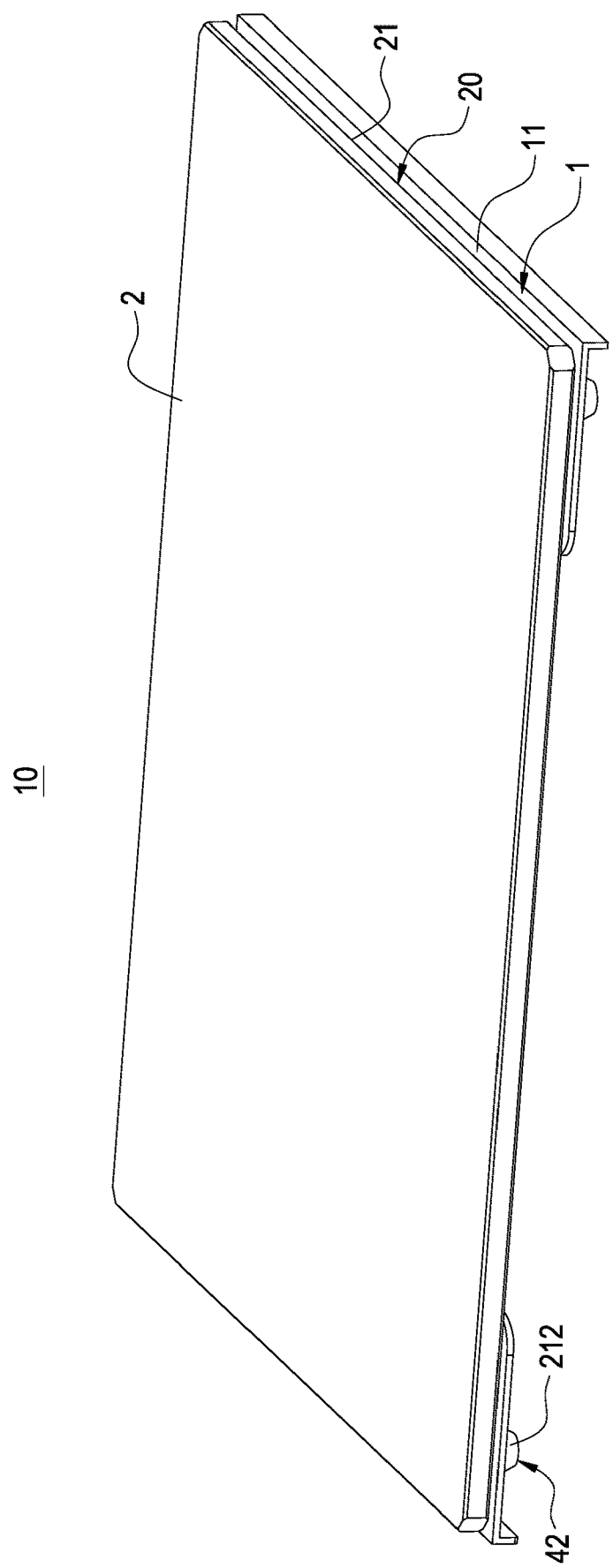
FIG. 6 is an assembled view of the second embodiment of the platform structure of the disclosed example.
Figure 7:
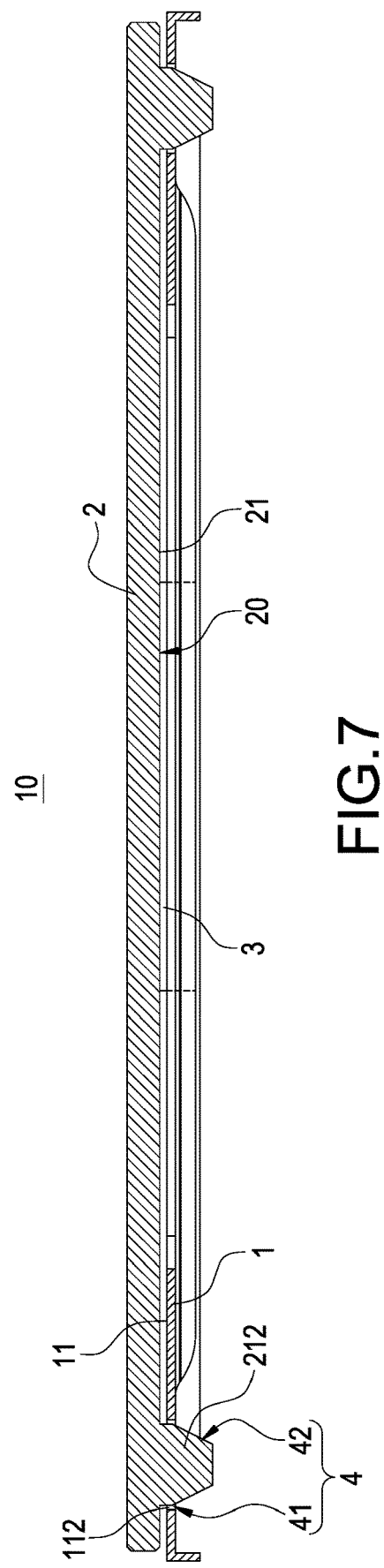
FIG. 7 is a cross-sectional view of the second embodiment of the platform structure of the disclosed example.

Please refer to FIGS. 5-7, which show the second embodiment of the platform structure 10 of the disclosed example. The second embodiment is approximately identical to the first embodiment. The difference therebetween is the positioning structure 4.

In detail, the first positioning portion 41 includes a plurality of through holes 112 downward caved from the top 11 of the movable platform 1. The second positioning portion 42 includes a plurality of conic bars 212 downward projecting from the bottom 21 of the work carrier 2. Each of the conic bars 212 engages with one of the through holes 112. A conic shape of the conic bar 211 is easier to be inserted into the through hole 112. The conic bars 212 are arranged to be adjacent to a periphery of the work carrier 2. Thereby, a function and effect the same as that of the first embodiment can also be achieved.

Figure 8:
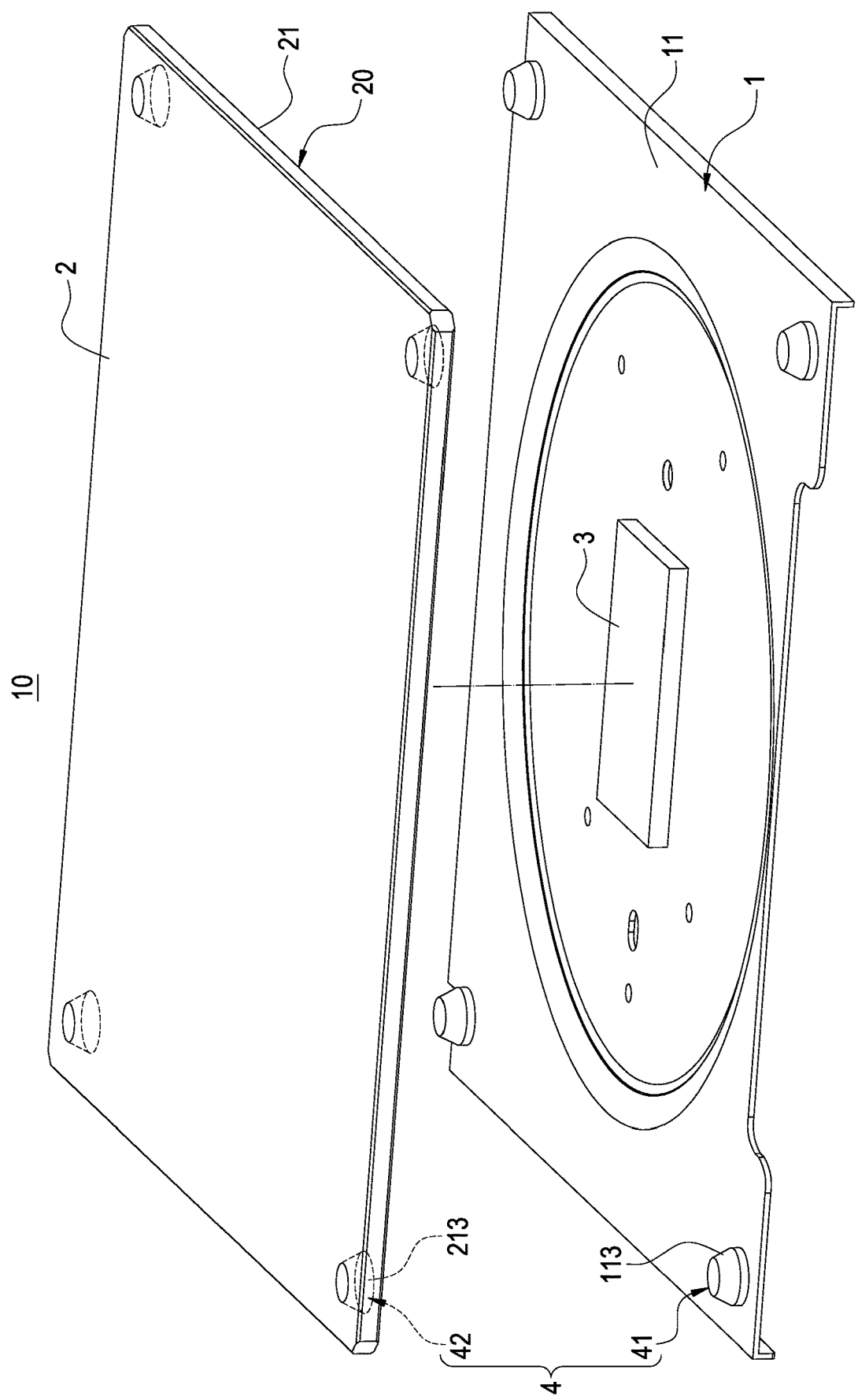
FIG. 8 is an exploded view of the third embodiment of the platform structure of the disclosed example.
Figure 9:
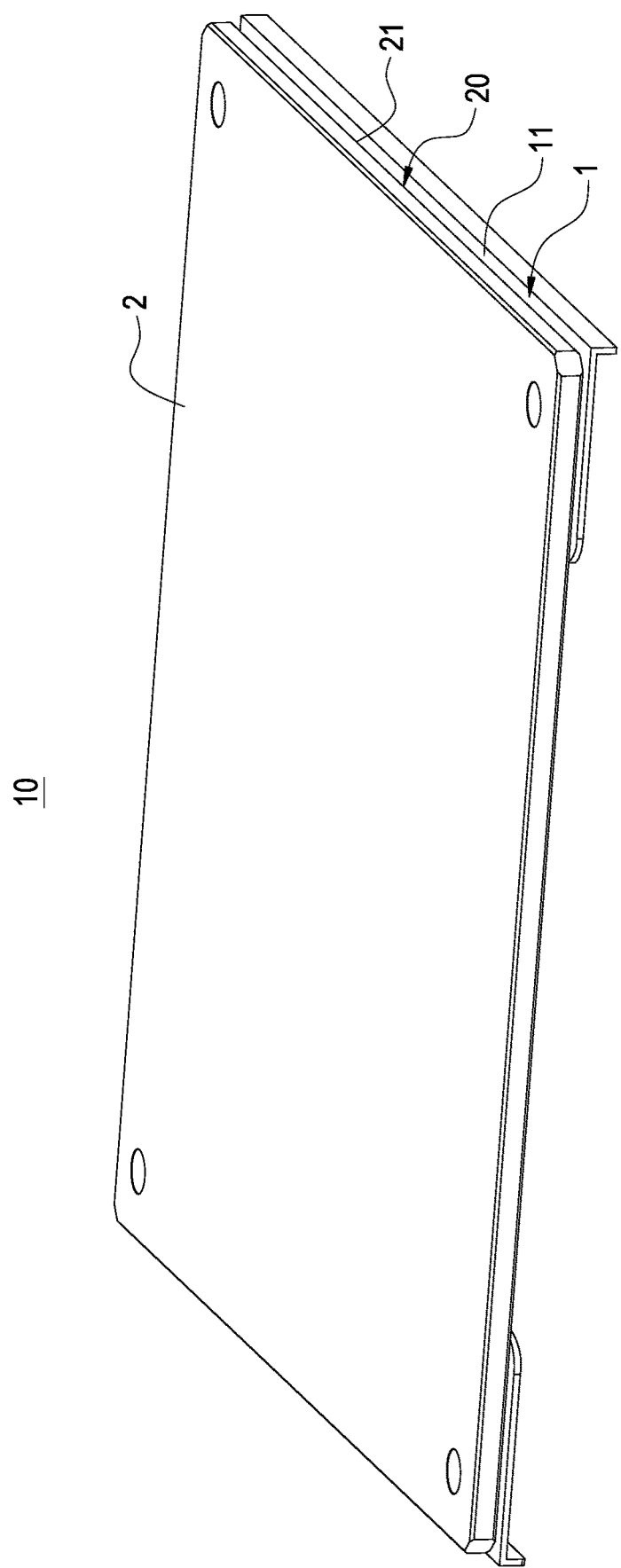
FIG. 9 is an assembled view of the third embodiment of the platform structure of the disclosed example.
Figure 10:
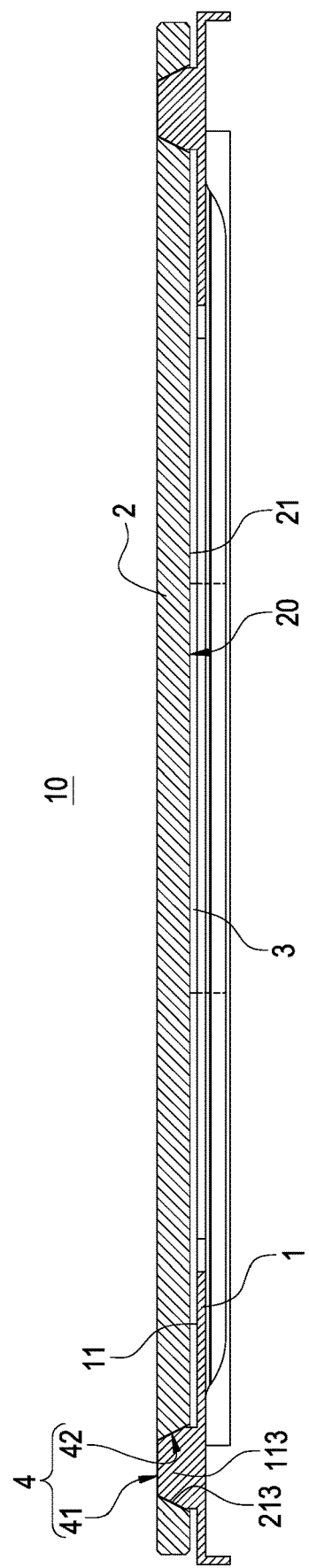
FIG. 10 is a cross-sectional view of the third embodiment of the platform structure of the disclosed example.

Please refer to FIGS. 8-10, which show the third embodiment of the platform structure 10 of the disclosed example. The third embodiment is approximately identical to the first embodiment. The difference therebetween is the positioning structure 4.

In detail, the first positioning portion 41 includes a plurality of conic protrusions 113 upward projecting from the top 11 of the movable platform 1. The second positioning portion 42 includes a plurality of conic holes 213 upward caved from the bottom 21 of the work carrier 2. Each of the conic protrusions 213 engages with one of the conic holes 113. A conic shape of the conic protrusion 213 is easier to be inserted into the conic hole 113. The conic protrusions 213 are arranged to be adjacent to a periphery of the work carrier 2. Thereby, a function and effect the same as that of the first embodiment can also be achieved.

Figure 11:
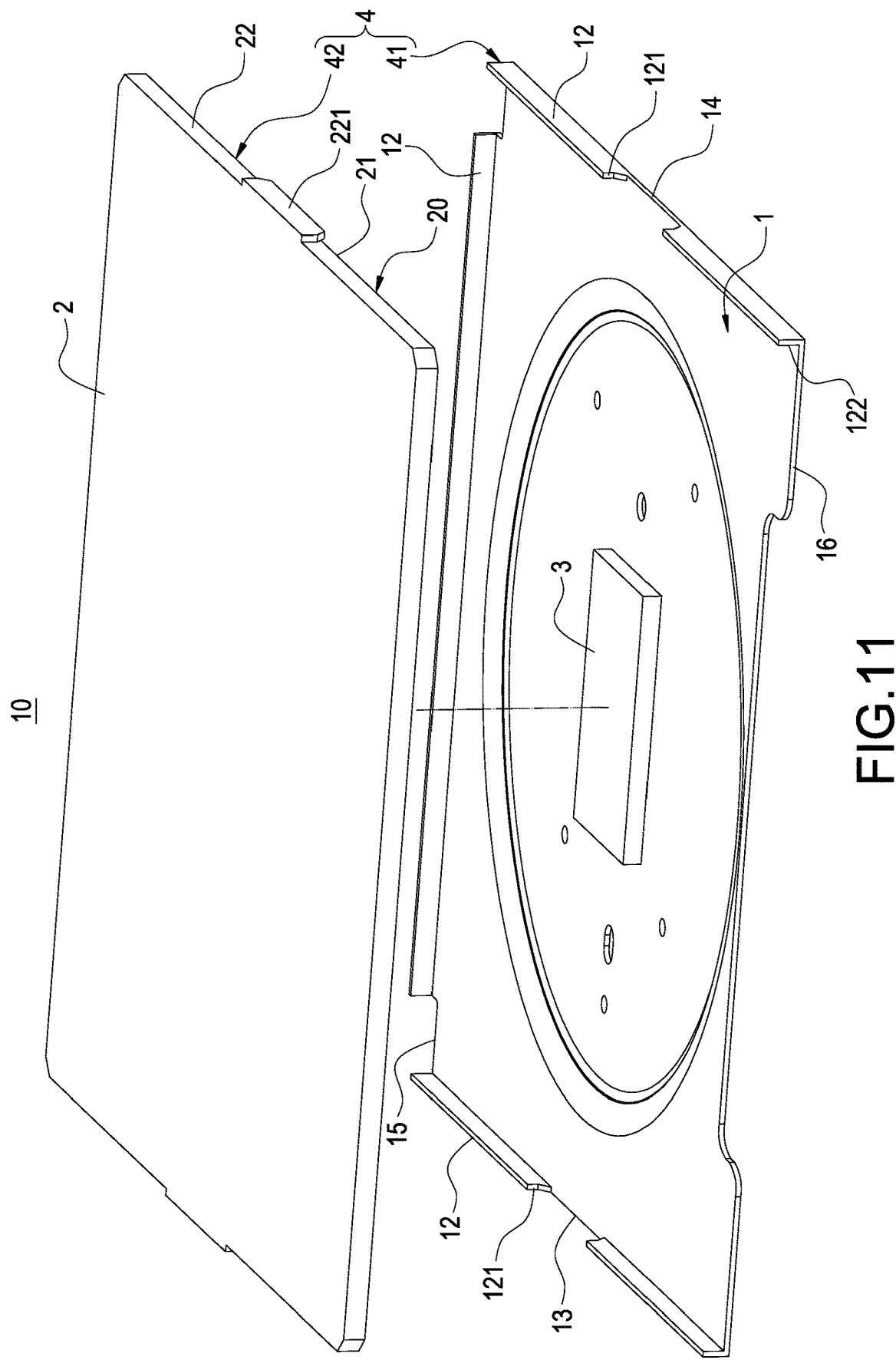
FIG. 11 is an exploded view of the fourth embodiment of the platform structure of the disclosed example.
Figure 12:
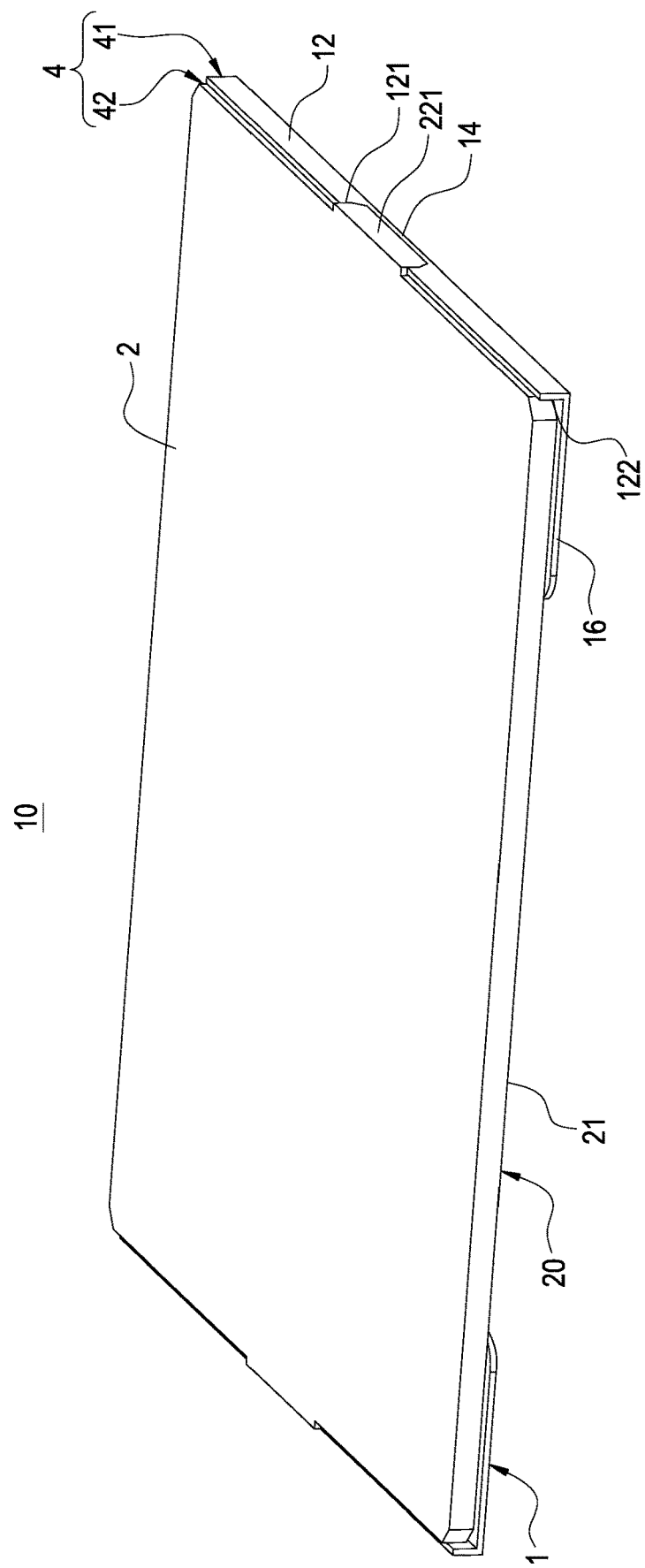
FIG. 12 is an assembled view of the fourth embodiment of the platform structure of the disclosed example.
Figure 13:
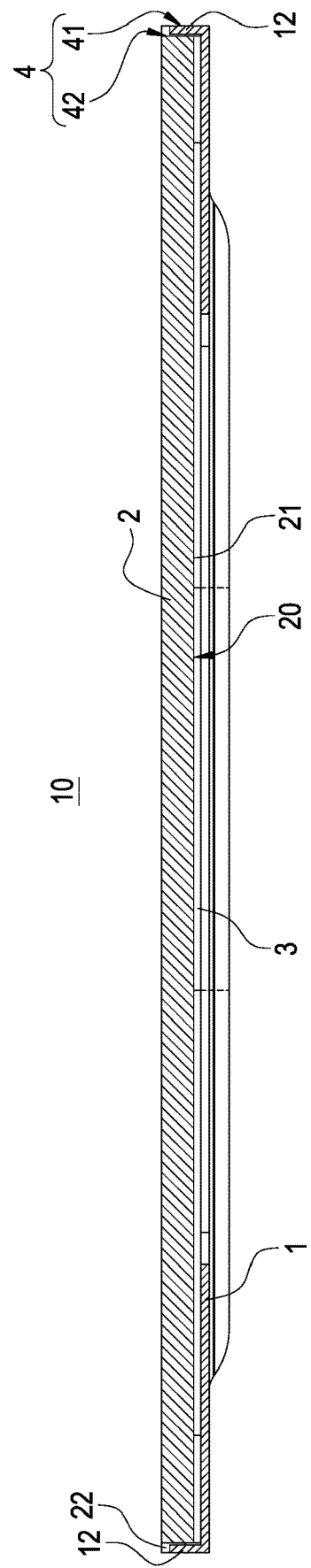
FIG. 13 is a cross-sectional view of the fourth embodiment of the platform structure of the disclosed example.

Please refer to FIGS. 11-13, which show the fourth embodiment of the platform structure 10 of the disclosed example. The fourth embodiment is approximately identical to the first embodiment. The difference therebetween is the positioning structure 4.

In detail, the first positioning portion 41 includes a plurality of stopping sheets 12 upward extending from the movable platform 1. The stopping sheets 12 upward extends from a left side 13, a right side 14 and a rear side 15 of the movable platform 1. The second positioning portion 42 includes a surrounding wall 22 formed on the edges of the work carrier 2. The work carrier 2 is engaged within the stopping sheets 12 and the surrounding wall 22 is blocked by the stopping sheets 12. Thereby, a function and effect the same as that of the first embodiment can also be achieved.

Additionally, each of the stopping sheets 12 formed on the left side 13 and right side 14 is downward formed with an opening 121, and the surrounding wall 22 of the work carrier 2 is extended with two protrudent blocks 221 engaging with the openings 121 so as to make the work carrier 2 firmly positioned on the movable platform 1 and stably move with the movable platform 1.

In more detail, the stopping sheet 12 on the front side 16 of the movable platform 1 relative to the left side 13 and the right side 14 is formed with an aperture 122 for providing a robot hand to take the work carrier 2.

Figure 14:
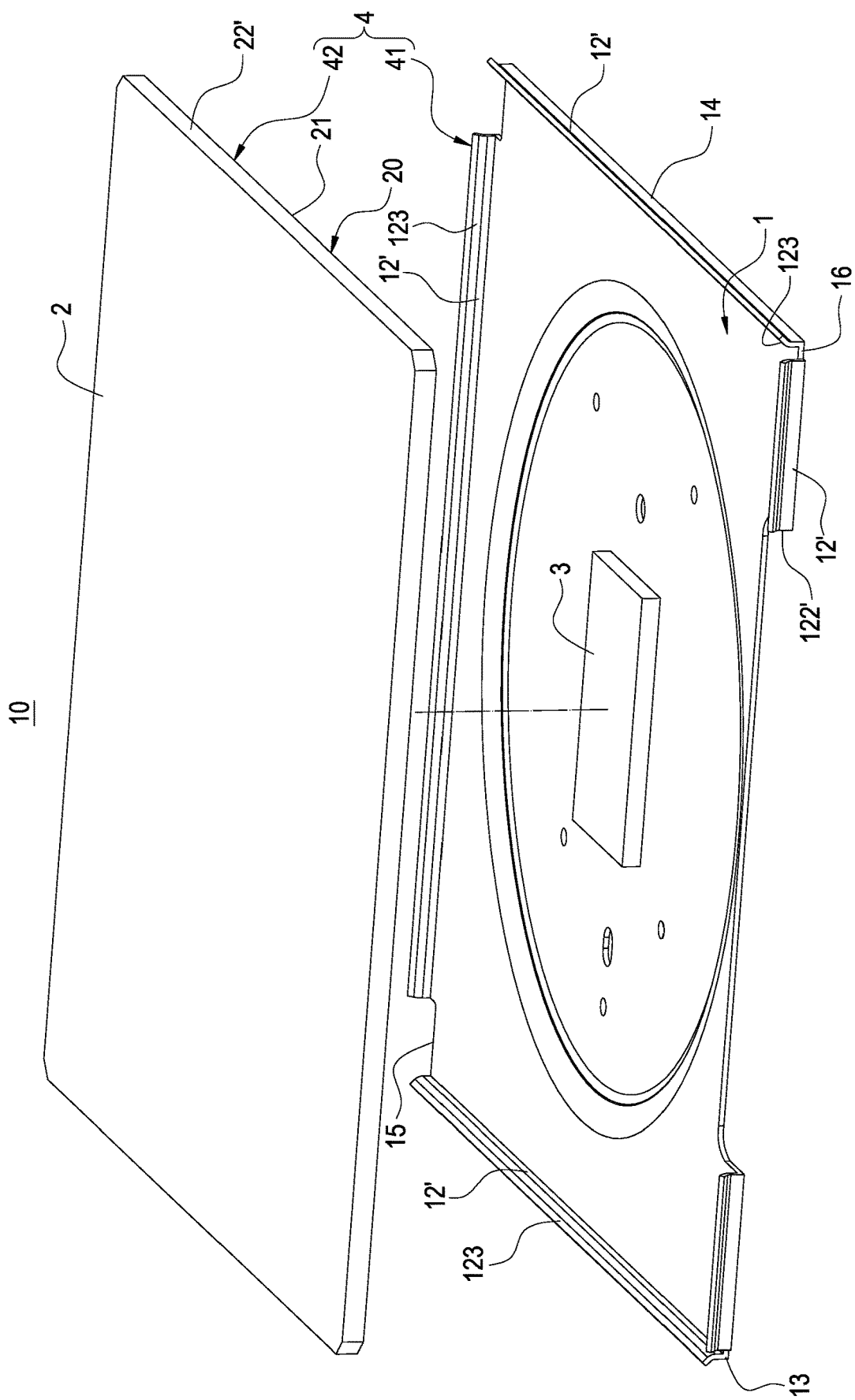
FIG. 14 is an exploded view of the fifth embodiment of the platform structure of the disclosed example.
Figure 15:
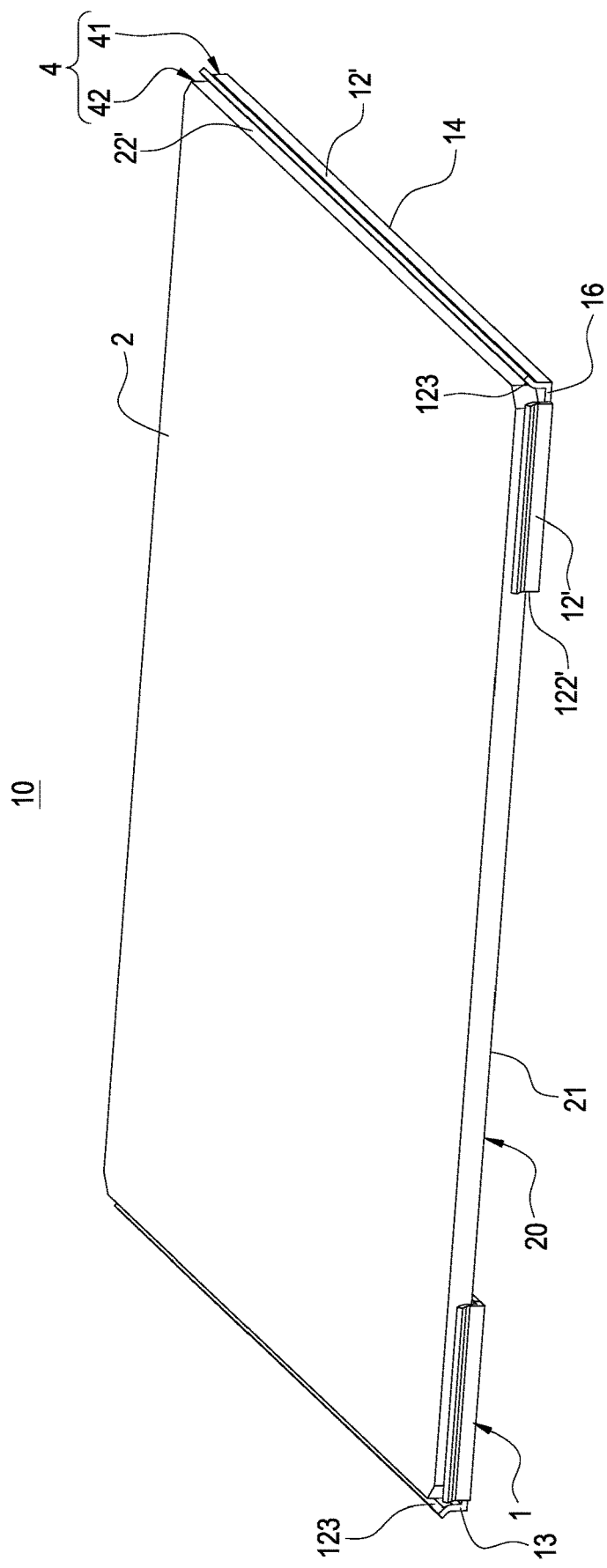
FIG. 15 is an assembled view of the fifth embodiment of the platform structure of the disclosed example.
Figure 16:
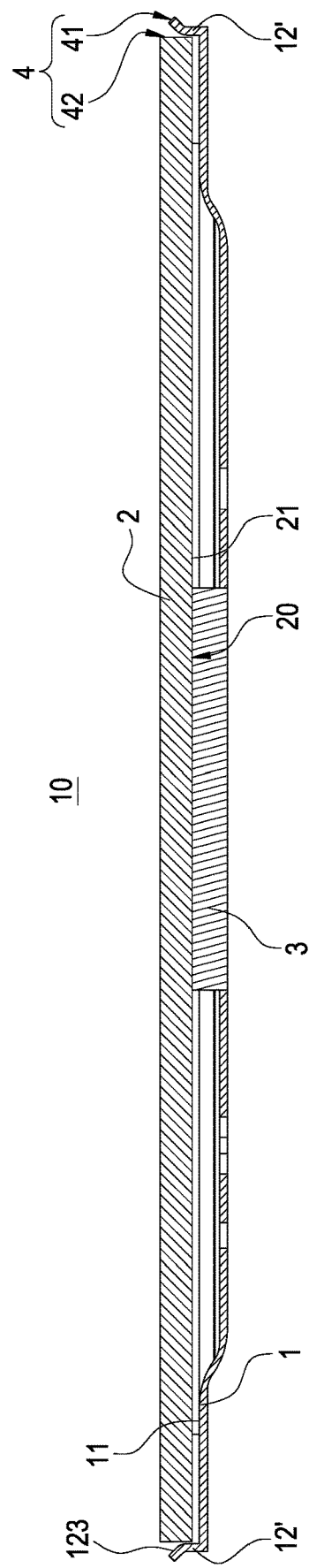
FIG. 16 is a cross-sectional view of the fifth embodiment of the platform structure of the disclosed example.

Please refer to FIGS. 14-16, which show the fifth embodiment of the platform structure 10 of the disclosed example. The fifth embodiment is approximately identical to the first embodiment. The difference therebetween is the positioning structure 4.

In detail, the first positioning portion 41 includes a plurality of stopping sheets 12' upward extending from the movable platform 1. The stopping sheets 12' upward extends from a left side 13, a right side 14, a rear side 15 and a front side 16 of the movable platform 1. The second positioning portion 42 includes a surrounding wall 22' formed on the edges of the work carrier 2. The work carrier 2 is engaged within the stopping sheets 12' and the surrounding wall 22' is blocked by the stopping sheets 12'. Thereby, a function and effect the same as that of the first embodiment can also be achieved.

Additionally, a top of each of the stopping sheets 12' is outward formed with a bending section 123 for being convenient to guide the work carrier 2 to be engaged within the stopping sheets 12' of the movable platform 1.

In more detail, the stopping sheet 12' on the front side 16 is downward formed with an aperture 122' for providing a robot hand to take the work carrier 2.

It will be appreciated by persons skilled in the art that the above embodiments have been described by way of example only and not in any limitative sense, and that various alterations and modifications are possible without departure from the scope of the disclosed example as defined by the appended claims.

What is claimed is:

1. A platform structure of a 3D printer, comprising:
   a movable platform (1);
   a work carrier (2), either one of the movable platform (1) and the work carrier (2) having a magnetically attractable portion (20); and
   an electromagnet (3), installed on the other one of the movable platform (1) and the work carrier (2), and being capable of magnetically attracting the magnetically attractable portion (20) to make the work carrier (2) removably connect downward to the movable platform (1);
   wherein when the electromagnet (3) is activated and the work carrier (2) is put on the movable platform (1) by a robot hand, the electromagnet (3) magnetically is configured to attract the magnetically attractable portion (20) to install the work carrier (2) on the movable platform (1), and when the electromagnet (3) is stopped to eliminate magnetic attraction, the work carrier (2) is separated or removed from the movable platform (1), thereby a function of assembling and dissembling the work carrier (2) with the movable platform (1) is achieved;

wherein the movable platform (1) is dented at a front side (16), and a wall (12) extends upward from each of a left side (13), a right side (14) and a rear side (15), except the front side (16) of the movable platform (1), for being configured to provide the robot hand to take the work carrier (2) from the front side (16) as the electromagnet (3) is stopped to eliminate the magnetic attraction; an opening (121) is formed at each of both walls (12) of the left side (13) and the right side (14), and a protrudent block (221) is formed on each of two sides of a surrounding surface (22) of the work carrier (2) to engage with the opening (121) so as to make the work carrier (2) positioned on the movable platform (1) through fitting of the surrounding surface (22) with the wall (12) and a secured engagement of the protrudent block (221) and the opening (121), the work carrier (2) together with the movable platform (1) is moved under a dynamic operation of the robot hand as the electromagnet (3) is activated.

2. The platform structure of the 3D printer of claim 1, wherein the electromagnet (3) is fixed to the movable platform (1), and the work carrier (2) is made of a magnetically attractable material.

\* \* \* \* \*